United States Patent
Hecker et al.

(10) Patent No.: US 12,246,689 B2
(45) Date of Patent: Mar. 11, 2025

(54) METHOD AND EQUIPMENT FOR ESTIMATING A BRAKE TEMPERATURE, METHOD FOR ESTIMATING A BRAKING FACTOR AND COMPUTER PROGRAM PRODUCT

(71) Applicant: Knorr-Bremse Systeme Fuer Nutzfahrzeuge GmbH, Munich (DE)

(72) Inventors: Falk Hecker, Markgroeningen (DE); Ulrich Guecker, Schwieberdingen (DE); Adnan Mustapha, Maulbronn (DE); Oliver Sawodny, Stuttgart (DE); Simon Goeltz, Winterbach (DE); Roman Sauer, Stuttgart (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 238 days.

(21) Appl. No.: 18/040,890

(22) PCT Filed: Aug. 13, 2021

(86) PCT No.: PCT/EP2021/072609
§ 371 (c)(1),
(2) Date: Feb. 7, 2023

(87) PCT Pub. No.: WO2022/048884
PCT Pub. Date: Mar. 10, 2022

(65) Prior Publication Data
US 2023/0322197 A1    Oct. 12, 2023

(30) Foreign Application Priority Data
Sep. 2, 2020 (EP) .................. 20194050

(51) Int. Cl.
B60T 17/22    (2006.01)
F16D 65/12    (2006.01)
F16D 66/00    (2006.01)

(52) U.S. Cl.
CPC ............ B60T 17/221 (2013.01); F16D 65/12 (2013.01); *F16D 2066/001* (2013.01); *F16D 2066/006* (2013.01)

(58) Field of Classification Search
CPC ........ B60T 17/221; F16D 65/12; F16D 66/00; F16D 2066/001; F16D 2066/006
(Continued)

(56) References Cited

FOREIGN PATENT DOCUMENTS

| EP | 0594113 A1 | 4/1994 |
|----|------------|--------|
| EP | 1950111 A2 | 7/2008 |

(Continued)

OTHER PUBLICATIONS

International Search Report for PCT/EP2021/072609, Issued Nov. 5, 2021.
(Continued)

*Primary Examiner* — Hai H Huynh
(74) *Attorney, Agent, or Firm* — NORTON ROSE FULBRIGHT US LLP; Gerard A. Messina

(57) ABSTRACT

Method and equipment for estimating a brake temperature, method for estimating a braking factor and computer program product, including a method for estimating a brake temperature of a brake disc of a vehicle, by performing the following: virtually separating the brake disc in a brake disc body and a brake disc contact surface layer; and estimating the temperature of the brake disc contact surface layer in dependence of the temperature of the braking disc body and a heat input in the brake disc contact surface layer due to a (Continued)

braking action, in which the estimated temperature of the brake disc contact surface layer corresponds to the brake temperature.

18 Claims, 1 Drawing Sheet

(58) Field of Classification Search
USPC .......................................................... 701/70
See application file for complete search history.

(56) References Cited

FOREIGN PATENT DOCUMENTS

| FR | 2733830 A1 | 11/1996 |
|----|------------|---------|
| KR | 20070112497 A | 11/2007 |

OTHER PUBLICATIONS

Extended European Search Report for EP Patent Application No. 20194050.9, Issued Dec. 17, 2020.

METHOD AND EQUIPMENT FOR ESTIMATING A BRAKE TEMPERATURE, METHOD FOR ESTIMATING A BRAKING FACTOR AND COMPUTER PROGRAM PRODUCT

FIELD OF THE INVENTION

The present invention relates to a method for estimating a brake temperature of a brake disc of a vehicle, a method for estimating a braking factor of a disc brake of a vehicle, an equipment for estimating a brake temperature of a brake disc of a vehicle, and a respective computer program product.

BACKGROUND INFORMATION

The braking factor of braking actions as transformation of a braking pressure into a braking torque acting on a wheel depends on the temperature of the brake. Accordingly, the brake temperature may be measured by suitable temperature sensors. However, such temperature sensors for braking applications are cost-intensive due to the limited installation space, rotating parts, the high temperatures occurring and required resistance against contaminants. As the relevant brake temperature is the one to be obtained in the contact area of the brake disc with the brake pad, the above problems of measuring a brake temperature become even more severe.

SUMMARY OF THE INVENTION

Accordingly, it is an object of the present invention to provide a method and equipment for estimating a brake temperature of a brake disc of a vehicle and thereby enabling an estimation of a braking factor in an easy manner.

The object may be solved by a method for estimating a brake temperature of a brake disc of a vehicle according to the description herein, a method for estimating a braking factor of a disc brake of a vehicle according to the description herein, an equipment for estimating a brake temperature of a brake disc of a vehicle according to the description herein, and a computer program product according to the description herein. Further aspects of the present invention are subject of the further descriptions herein.

The inventive method for estimating a brake temperature of a brake disc of a vehicle according to the present invention comprises the steps of:

virtually separating the brake disc in a brake disc body and a brake disc contact surface layer and estimating the temperature of the brake disc contact surface layer in dependence of the temperature of the braking disc body and a heat input in the brake disc contact surface layer due to a braking action, wherein the estimated temperature of the brake disc contact surface layer corresponds to the brake temperature.

The present invention therefore provides a model approach for a model based estimation of the brake temperature. The brake disc as a whole has a relatively slow temperature dynamic while the surface in contact with the brake pad provides higher temperature dynamics. Accordingly, the present invention virtually separates the brake disc into a brake disc body and a brake disc contact surface layer. As the brake disc contact surface layer in view of the brake disc body is comparably thin with a low mass, the brake disc body may be assumed as the brake disc as a whole for the ease of calculations. The resulting deficiency may be acceptable in view of the accuracy required for different utilizations of the model results. However, for high accuracies, the brake body disc may be further specified, i.e. explicitly subtracting at least one brake disc contact surface layer. The temperature of the brake disc contact surface layer can now be estimated in dependence of the temperature of the braking disc body as influencing the temperature of brake disc body due to heat exchange and the heat input into the brake disc contact surface layer on a side opposite to the brake disc body due to a braking action. In other words, the brake disc contact surface layer is sandwiched between a brake pad and the brake disc body when the vehicle is decelerated or driving downhill. In such events, which is the relevant one for any temperature dynamics, the brake disc body functions as a heat sink.

The temperature of the brake disc contact surface layer estimated based on the above approach corresponds to the brake temperature, which is the temperature to be determined for the braking factor. The term "correspond" allows the brake temperature to be set as the temperature of the brake disc contact surface layer and/or to be adapted, e.g. based on predetermined algorithms and/or coefficients. For example, the braking temperature may be estimated by multiplying the brake disc contact surface temperature with a correction coefficient based on empiric data. Such correction coefficient may also vary depending on temperature of the brake disc contact surface layer.

Due to the above approach, the estimation of the brake temperature may be used alternatively or in addition to a costly sensor technology. The brake temperature estimation may provide reliable temperature results with reduced complexity and therefore applicability for serial control devices.

In some embodiments, the temperature of the brake disc contact surface layer is estimated by iteratively applying the thermal balance equation $$m_{cont} \times c_{cont} \times \dot{T}_{cont} = \Sigma \dot{Q} = \dot{Q}_{cont,in} - \dot{Q}_{cont,rad} - \dot{Q}_{cont,conv} - \dot{Q}_{cont,cond},$$

wherein $m_{cont}$ is a mass of the brake disc contact surface layer in [kg], $c_{cont}$ is a thermal capacity of the brake disc contact surface layer in [J/(kgK)], $\dot{T}_{cont}$ is a temperature change of the brake disc contact surface layer in [° C./s], $\dot{Q}_{con,in}$ is a heat input in the brake disc contact surface layer due to a braking action in [J/s], $\dot{Q}_{cont,rad}$ is a heat loss of the brake disc contact surface layer due to heat radiation in [J/s], $\dot{Q}_{cont,conv}$ is a heat loss of the brake disc contact surface layer due to convection in [J/s], and $\dot{Q}_{cont,cond}$ is a heat loss of the brake disc contact surface layer due to conduction in [J/s].

The thermal balance equation is based on the virtual separation of the brake disc contact surface layer from the brake disc body and corresponding heat input and heat losses in balance to a change in thermal energy. For brake discs made of one material, $c_{cont}$ is equal to $c_{disc}$, which is a thermal capacity of the brake disc body in [J/(kgK)]. However, for coated brake discs or other material differences $c_{cont}$ may deviate from $c_{disc}$.

The different parameters of the thermal balance equation for the temperature of the brake disc contact surface layer are physically determinable. For example, the determination may be based on measurement data of sensed brake discs and/or data sheets.

Still further, $\dot{Q}_{cont,in}$ may be calculated as $$\dot{Q}_{cont,in} = (1-\gamma) \times P_{brk},$$

wherein $\gamma$ is a transition coefficient from a braking pad to the brake disc contact surface layer, and $P_{brk}$ is a braking power.

The heat input is caused by a braking action, i.e. due to frictional contact between the brake pad and the brake disc contact surface layer. Accordingly, the heat input may be calculated in dependency of the brake power $P_{brk}$. This corresponds to $\dot{Q}_{pad,in}=\gamma^*P_{brk}$, wherein $\dot{Q}_{pad,in}$ is the heat input in the brake pad due to the brake power $P_{brk}$.

The transition coefficient $\gamma$ from a braking pad to the brake disc contact surface layer may be calculated based on the thermal conductivity $\lambda$ for the brake disc $\lambda_{disc}$ and the brake pad $\lambda_{pad}$ in [W/(m*K)] and the temperature conductivity $\lambda$, also referred to as thermal diffusivity, brake disc $k_{disc}$ and the brake pad $k_{pad}$ in [m²/s] using the intermediate value of the thermal activity coefficient $\epsilon$ as $$\gamma = \frac{1}{1+\epsilon},$$

$$\epsilon = \frac{\lambda_{disc}\sqrt{k_{pad}}}{\lambda_{pad}\sqrt{k_{disc}}}.$$

The temperature conductivity k may be calculated as $$k = \frac{\lambda}{\rho \cdot c},$$

wherein $\lambda$ is the thermal conductivity in [W/(m*K)], $\rho$ is the density in [kg/m³], and c is the thermal capacity.

In some embodiments, the braking power $P_{brk}$ may be calculated as $$P_{brk} = -\frac{dE_{kin}}{dt} - \frac{dE_{pot}}{dt} = -\frac{1}{2}(m_{dyn} \cdot v_{veh} \cdot a_{veh} - m_{dyn} \cdot g \cdot \dot{h}),$$

wherein $dE_{kin}/dt$ is a change in kinetic energy, $dE_{pot}/dt$ is a change in potential energy, $m_{dyn}$ is a dynamic wheel load per axle, $a_{veh}$ is an acceleration of the vehicle, g is a gravity acceleration, and $\dot{h}$ is a change in altitude.

Thus, the braking power $P_{brk}$ is calculated based on the energy of the vehicle. According to the above energy approach, a change in the potential energy is considered, for example, with respect to a change in altitude $\dot{h}$ if a vehicle moves downhill. Alternatively or in addition, the braking power $P_{brk}$ may be calculated as $$P_{brk} = F_{brk} \times \Delta v = M_{brk} \times \frac{v_{veh}}{r_{dyn}},$$

wherein $F_{brk}$ is a braking force, $\Delta v$ is the relative lateral (slip) velocity between brake pad and disc, $M_{brk}$ is a braking torque, and $r_{dyn}$ is the dynamic wheel radius.

The calculation of the braking power $P_{brk}$ as a function of the braking torque $M_{brk}$ is based on a relatively precise knowledge of the brake torque $M_{brk}$, which may be not available. This is due to a varying brake factor, which depends on the temperature and more again. Thus, the more general applicable way of calculating the brake-torque is the approach above with the braking power $P_{brk}$ as a function of the changes in energy, where the variables are widely measured. However, this approach is not as detailed as the one considering the braking torque $M_{brk}$, since influences as the brake distribution between the wheels is not included.

In some embodiments, $\dot{Q}_{cont,rad}$ may be calculated as $$\dot{Q}_{cont,rad}=e\cdot\sigma\cdot A_{cont}\cdot(T_{cont}^4-T_{env}^4),$$

wherein e an emission degree $e\in[0, 1]$, $\sigma$ ist the Stefan-Boltzmann constant $\sigma=5.67*10^{-8}$ W/(m²K⁴), $A_{cont}$ is a contact area of the brake disc contact surface layer in [m²], and $T_{env}$ is the temperature of an environment.

In some embodiments, $\dot{Q}_{cont,conv}$ is calculated as $$\dot{Q}_{cont,conv}=h_{cont}\cdot A_{cont}\cdot(T_{cont}-T_{env}),$$

wherein $h_{cont}$ is a heat transfer coefficient of the brake disc contact surface layer in [W/(m²K)].

In some embodiments, $\dot{Q}_{cont,cond}$ is calculated as $$\dot{Q}_{cont,cond}=\lambda\cdot A_{cont}\cdot(T_{cont}-T_{disc})/d_{cont},$$

wherein $\lambda$ is a thermal conductivity of the brake disc contact surface layer in [W/(mK)], and $d_{cont}$ is a thickness of the brake disc contact surface layer in [m].

Advantageously, the initial condition for $\dot{T}_{cont,n}$ and/or $T_{cont,n}$ for any of the above equations is predetermined and $T_{cont,n+1}$ is calculated as $T_{cont,n+1}=T_{cont,n}+\Delta t*\dot{T}_{cont,n}$.

$\dot{T}_{cont,n}$ may also be calculated from the initial temperatures of the disc and contact surface layer.

For example, as initial condition for all temperatures, i.e. $T_{cont,0}$ as well as $T_{disc,0}$, it may be assumed that before driving the temperatures are equal to the ambient temperature.

Accordingly, the temperature $T_{cont,n+1}$ can be estimated based on initial conditions. In general, each temperature $T_{cont,n+1}$ of the brake disc contact surface layer can be estimated on the basis of the preceding temperature $T_{cont,n}$ and the respective change in temperature $\dot{T}_{cont,n}$. Deviations from such theoretical estimations to real temperature may be reduced by selecting small values for $\Delta t$. However, the smaller the values for $\Delta t$ the higher the number of calculations and data transfer. Accordingly, $\Delta t$ may be selected to allow appropriate results within a limited number of calculations.

For calculations requiring the temperature $T_{disc}$ of the brake disc body, $T_{disc}$ may be detected by a sensor.

As the temperature $T_{disc}$ of the brake disc body is the inertial temperature of the whole disc, the sensor does not need to be positioned for a measuring a temperature at the contact surface between the brake disc and the brake pad. Instead, such sensor may be arranged to detect a temperature $T_{disc}$ of the disc body based on a side of the brake disc body opposite to the contact surface between the brake disc and the brake pad and/or laterally displaced therefrom. The temperature $T_{disc}$ of the disc body may be equal to the detected temperature or otherwise determined based on the detected temperature, e.g. an average temperature over a predetermined period of time or the detected temperature multiplied by a predetermined coefficient.

Alternatively or in addition, the temperature $T_{disc}$ of the brake disc body may be estimated by iteratively applying the thermal balance equation $$m_{disc}\cdot C_{disc}\cdot\dot{T}_{disc}=\Sigma\dot{Q}$$

$$=\dot{Q}_{disc,in}-\dot{Q}_{disc,rad}-\dot{Q}_{disc,conv}-\dot{Q}_{disc,cond}=\dot{Q}_{cont,cond}-\dot{Q}_{disc,rad}-\dot{Q}_{disc,conv}-\dot{Q}_{disc,cond},$$

wherein $m_{disc}$ is a mass of the brake disc body in [kg], $c_{disc}$ is a thermal capacity of the brake disc body in [J/(kgK)], $\dot{T}_{disc}$ is a temperature change of the brake disc body in [° C./s], $\dot{Q}_{disc,in}$ is the heat input in the brake disc body due to conduction from the brake disc contact surface layer in

[J/s], $\dot{Q}_{disc,rad}$ is a heat loss of the brake disc body due to heat radiation in [J/s], $\dot{Q}_{disc,conv}$ is a heat loss of the brake disc body due to convection in [J/s], and $\dot{Q}_{disc,cond}$ is a heat loss of the brake disc contact surface layer due to conduction in [J/s].

The principles of such estimation of the temperature $T_{disc}$ of the brake disc body are similar to the ones in view of the temperature $T_{cont}$ of the brake disc contact surface layer.

A combination of an estimated and sensor-based temperature $T_{disc}$ of the brake disc body may not only provide redundancy but may also be applied to monitor and/or adapt the estimated temperature.

In some embodiments, $\dot{Q}_{disc,rad}$ may be calculated as $$\dot{Q}_{disc,rad} = e \cdot \sigma \cdot A_{disc,out} \cdot (T_{disc}^4 - T_{env}^4)$$

wherein $A_{disc,out}$ is an outer area of the brake disc body in [m²].

The outer area describes the surface of all areas, that facing away from the disc and may therefore be seen from outside. For example, with ventilated discs, the area of the ventilation channels is not included. The reason is, that in an ideal case all radiated heat from a surface in the ventilation channels is directly heating the opposite area of the disc, so it is only an internal heat flow, that is not changing the overall balance of the disc.

In some embodiments, $\dot{Q}_{disc,conv}$ may be calculated as $$\dot{Q}_{disc,conv} = h_{disc} \cdot (A_{disc,out} + A_{disc,in}) \cdot (T_{disc} - T_{env}),$$

wherein $h_{disc}$ is a heat transfer coefficient of the brake disc body in [W/(m²K)], and $A_{disc,in}$ is an inner area of the brake disc body in [m²].

The inner area is the area inside the ventilating channels.

In some embodiments, $\dot{Q}_{disc,cond}$ may be calculated as $$\dot{Q}_{disc,cond} = \lambda \cdot A_{axle} \cdot (T_{disc} - T_{axle}) / (l_{axle}/2),$$

wherein $A_{axle}$ is an axle cross section area in [m²], $T_{axle}$ is a temperature of the axle in [° C.], and $l_{axle}$ is a length of the axle in [m].

Advantageously, the initial condition for $T_{disc,n}$ and $T_{cont,n}$, and/or $\dot{T}_{disc,n}$ may be predetermined and $T_{disc,n+1}$ is calculated as $T_{disc,n+1} = T_{disc,n} + \Delta t \cdot \dot{T}_{disc,n}$.

$\dot{T}_{disc,n}$ may also be calculated from the initial temperatures of the disc and contact surface layer.

Similarly as already described for the temperature $T_{cont}$ of the brake disc contact surface layer, the temperature $T_{disc,n+1}$ can be estimated based on initial conditions. Again, deviations from such theoretical estimations to real temperature may be reduced by selecting small values for $\Delta t$. However, the smaller the values for $\Delta t$ the higher the number of calculations and data transfer. Accordingly, $\Delta t$ may be selected to allow appropriate results within a limited number of calculations.

In another aspect, the present invention relates to a method for estimating a braking factor of a brake disc of a vehicle, wherein the braking factor is determined based on a brake temperature $T_{brk}$ as estimated by applying the method as described above.

The braking factor may be estimated as being calculated based on the brake temperature $T_{brk}$ or selected from a respective data base.

Another aspect of the present invention relates to an equipment for estimating a brake temperature $T_{brk}$ of a brake disc of a vehicle, comprising a control configured to estimate a temperature $T_{cont}$ of a brake disc contact surface layer as described above, wherein the control is configured to convert the temperature of a brake disc contact surface layer in a corresponding brake temperature.

As already addressed with respect to the inventive method, the brake temperature $T_{brk}$ may be converted in terms being set as the temperature of the brake disc contact surface layer and/or being adapted, e.g. based on predetermined algorithms and/or coefficients. For example, the brake temperature $T_{brk}$ may be $T_{brk} = \dot{T}_{cont}$ or $T_{brk} = a \cdot T_{cont}$ or may be follow even more complex mathematical descriptions.

The present invention also relates to a computer program product comprising instructions which, when the program is executed by a computer, cause the computer to carry out the method for estimating a brake temperature $T_{brk}$ of a brake disc of a vehicle and/or the method for estimating a braking factor of a disc brake of a vehicle, both as described above.

In summary, the present invention is based on a virtual separation of the brake disc in a brake disc body and a brake disc contact surface layer. The braking torque or acceleration and altitude data of the vehicle, in particular under consideration of the braking force distribution, serve as input of model of the brake temperature $T_{brk}$ of the brake disc. The respective estimation of the brake temperature may be implemented by thermal balance equations assuming, for example, point masses for the brake pad, the brake disc contact surface layer and the brake disc body. The thermal balance equations may be applied for the temperature of the brake disc contact surface layer and/or the brake disc body. The thermal flows may allocated depending on physical parameters.

Further advantages, aspects and details of the disclosure are subject to the claims, the following description of exemplary embodiments applying the principles of the disclosure and drawings.

DETAILED DESCRIPTION

Figure 1:
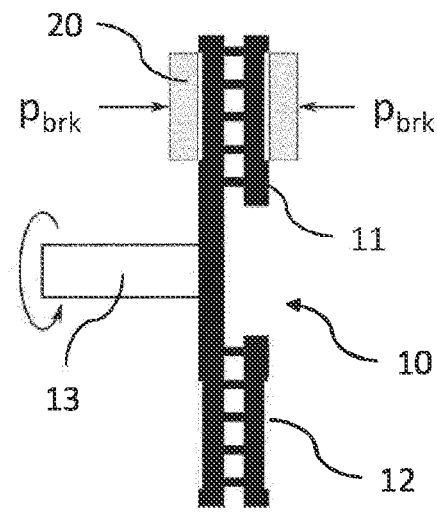
FIG. 1 is a schematic view on an exemplary brake disc and brake pads acting on such brake disc of a brake system.

FIG. 1 shows brake disc 10 configured to be rotated around an axle 13 of the brake disc as indicated by the arrow. The brake disc 10 may be decelerated due to a braking pressure $p_{brk}$ applied on the brake disc 10 by brake pads 20. Even though FIG. 1 shows two brake pads 20, the number of pads is not limited thereto. The whole contact area between the brake pads 20 and the brake disc 10 may be assumed as brake disc contact surface layer 12. Accordingly, the brake disc contact surface layer 12 may also be formed of a plurality of individual brake disc contact surface layer sections distributed over the brake disc. The thickness of such brake disc contact surface layer 12 perpendicular to the contact area with a brake pad 20 is assumed to be significantly less than the thickness of the remaining brake disc 10 assumed as brake disc body 11. For example, the disc contact surface layer 12 may be assumed to be approximately 10% of the overall thickness.

Figure 2:
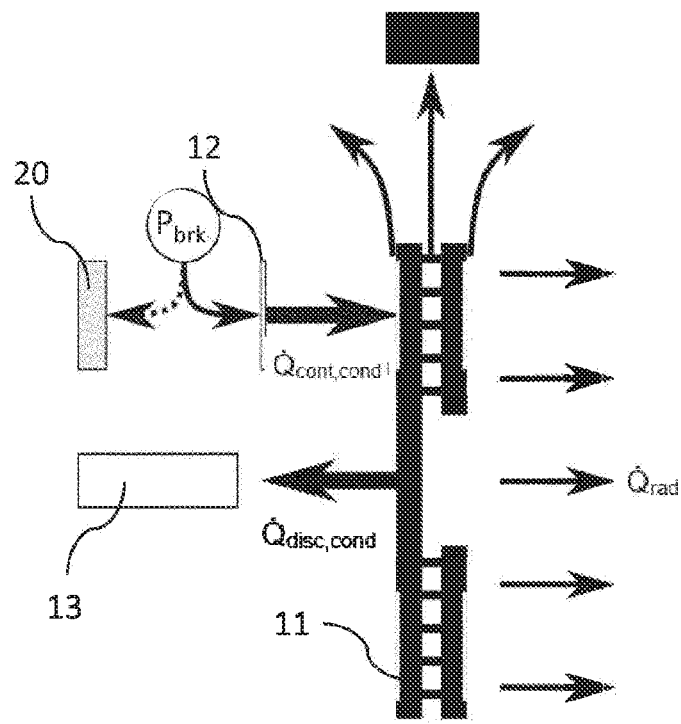
FIG. 2 is a schematic view of virtually separated components according to the brake disc and a brake pad as per FIG. 1 and further indicating respective heat inputs and losses.

To estimate a brake temperature $T_{brk}$ of a brake disc 10 of such a brake system for a vehicle, the brake disc and interacting components are virtually separated from each other as per FIG. 2. Further, respective heat inputs and losses are indicated by the indexed arrows.

The separated brake disc contact surface layer 12 in contact with the separated brake pad 20 receives a heat input in accordance with the applied braking power $P_{brk}$, the braking power $P_{brk}$ may be calculated as $$P_{brk} = -\frac{dE_{kin}}{dt} - \frac{dE_{pot}}{dt} = -\frac{1}{2}(m_{dyn} \cdot v_{veh} \cdot a_{veh} - m_{dyn} \cdot g \cdot h),$$

wherein $dE_{kin}/dt$ is a change in kinetic energy, $dE_{pot}/dt$ is a change in potential energy, $m_{dyn}$ is a dynamic wheel load per axle, $a_{veh}$ is an acceleration of the vehicle, g is a gravity acceleration, and h is a change in altitude. Alternatively or in addition, the braking power $P_{brk}$ may be calculated as $$P_{brk} = F_{brk} \times \Delta v = M_{brk} \times \frac{v_{veh}}{r_{dyn}},$$

wherein $F_{brk}$ is a braking force, $\Delta v$ is the relative lateral (slip) velocity between brake pad and disc, $M_{brk}$ is a braking torque, and $r_{dyn}$ is the dynamic wheel radius.

At the same time the separated brake disc contact surface layer 12 may transfer heat by conduction to the brake disc body 12, e.g. as $$\dot{Q}_{cont,cond} = \lambda \cdot A_{cont} \cdot (T_{cont} - T_{disc})/d_{cont},$$

wherein κ is a thermal conductivity of the brake disc contact surface layer in [W/(mK)], and $d_{cont}$ is a thickness of the brake disc contact surface layer in [m].

Further heat losses may be considered due to radiation and/or convection.

Similarly, the brake disc body 11 receives an heat input as per $\dot{Q}_{cont,cond}$ due to heat conduction from the brake disc contact surface to the brake disc body 11. However, the brake disc body 11 also transfers heat as $\dot{Q}_{conv}$ due to convection, $\dot{Q}_{rad}$ due to radiation and $\dot{Q}_{disc,cond}$ due to conduction towards the axle 13. In other words, the braking power Pbrk is supplied as energy input while energy is discharged due to convection, radiation and conduction.

Based on the separated brake disc contact surface layer 12 and the brake disc body 11 a model for estimating the brake temperature $T_{brk}$ corresponding to the temperature $T_{cont}$ of the brake disc contact surface layer 12 can be established.

According to an exemplary embodiment such model calculates the temperature $T_{disc}$ of the brake disc body 11 and the temperature $T_{cont}$ of the brake disc contact surface layer 12 based on the braking power in accordance with a braking torque or acceleration and altitude date, which may be under consideration of a braking force distribution.

As per the virtual separation according to FIG. 2, the calculations may be based on iteratively applying the following thermal balance equations:

a) For the Temperature $T_{disc}$ of the Brake Disc Body 11

$$m_{disc} \cdot c_{disc} \cdot \dot{T}_{disc} = \Sigma \dot{Q}$$

$$= \dot{Q}_{disc,in} - \dot{Q}_{disc,rad} - \dot{Q}_{disc,conv} - \dot{Q}_{disc,cond} = \dot{Q}_{cont,cond} - \dot{Q}_{disc,rad} - \dot{Q}_{disc,conv} - \dot{Q}_{disc,cond},$$

wherein $m_{disc}$ is a mass of the brake disc body in [kg], $c_{disc}$ is a thermal capacity of the brake disc body in [J/(kgK)], $\dot{T}_{disc}$ is a temperature change of the brake disc body in [° C./s], $\dot{Q}_{disc,in}$ is the heat input in the brake disc body due to conduction from the brake disc contact surface layer in [J/s], $\dot{Q}_{disc,rad}$ is a heat loss of the brake disc body due to heat radiation in [J/s], $\dot{Q}_{disc,conv}$ is a heat loss of the brake disc body due to convection in [J/s], and $\dot{Q}_{disc,cond}$ is a heat loss of the brake disc contact surface layer due to conduction in [J/s].

b) For the Temperature $\dot{T}_{cont}$ of the Brake Disc Contact Surface Layer 12

$$m_{cont} \times c_{cont} \times \dot{T}_{cont} = \Sigma \dot{Q} = \dot{Q}_{cont,in} - \dot{Q}_{cont,rad} - \dot{Q}_{cont,conv} - \dot{Q}_{cont,cond},$$

wherein $m_{cont}$ is a mass of the brake disc contact surface layer in [kg], $c_{cont}$ is a thermal capacity of the brake disc contact surface layer in [J/(kgK)], $\dot{T}_{cont}$ is a temperature change of the brake disc contact surface layer in [° C./s], $\dot{Q}_{cont,in}$ is a heat input in the brake disc contact surface layer due to a braking action in [J/s], $\dot{Q}_{cont,rad}$ is a heat loss of the brake disc contact surface layer due to heat radiation in [J/s], $\dot{Q}_{cont,conv}$ is a heat loss of the brake disc contact surface layer due to convection in [J/s], and $\dot{Q}_{cont,cond}$ is a heat loss of the brake disc contact surface layer due to conduction in [J/s].

The respective heat losses may be calculated as $$\dot{Q}_{disc,rad} = e \cdot \sigma A_{disc,out} \cdot (T_{disc}^4 - T_{env}^4)$$

$$\dot{Q}_{disc,conv} = h_{disc} \cdot (A_{disc,out} + A_{disc,in}) \cdot (T_{disc} - T_{env})$$

$$\dot{Q}_{disc,cond} = \lambda \cdot A_{axle} \cdot (T_{disc} - T_{axle})/(l_{axle}/2)$$

$$\dot{Q}_{cont,rad} = e \cdot \sigma A_{cont} \cdot (T_{cont}^4 - T_{env}^4)$$

$$\dot{Q}_{cont,conv} = h_{cont} \cdot A_{cont} \cdot (T_{cont} - T_{env})$$

$$\dot{Q}_{cont,cond} = \lambda \cdot A_{cont} \cdot (T_{cont} - T_{disc})/d_{cont},$$

wherein e an emission degree $e \in [0, 1]$, σ is the Stefan-Boltzmann constant $\sigma = 5.67 \ast 10^{-8}$ W/(m²K⁴), $A_{disc,out}$ is an outer area of the brake disc body in [m²], $T_{env}$ is an temperature of the environment, $h_{disc}$ is a heat transfer coefficient of the brake disc body in [W/(m²K)], $A_{disc,in}$ is an inner area of the brake disc body in [m²], $A_{axle}$ is an axle cross section area in [m²], $T_{axle}$ is a Temperature of the axle in [° C.], $l_{axle}$ is a length of the axle in [m], $A_{cont}$ is a contact area of the brake disc contact surface layer in [m²], $h_{cont}$ is a heat transfer coefficient of the brake disc contact surface layer in [W/(m²K)], λ is a thermal conductivity in [W/(mK)], and $d_{cont}$ is a thickness of the brake disc contact surface layer in [m].

As initial condition $T_{disc}$ and $T_{cont}$ are assumed to be equal to the ambient temperature $T_{amb}$ and $\dot{T}_{cont}$ may be calculated from the initial temperatures.

Thus, braking temperatures may be estimated by iteratively applying the thermal balance equations with $T_{cont,n+1} = T_{cont,n} + \Delta t \ast \dot{T}_{cont,n}$ or $T_{disc,n+1} = T_{cont,n} + \Delta t \ast \dot{T}_{cont,n}$, wherein n is an integer with $n \in N_0^+$.

The estimated brake temperature $T_{brk}$ may be converted into a corresponding braking factor to apply control functions.

The invention has been described in conjunction with various embodiments herein. However, other variations to the disclosed embodiments can be understood and effected by those skilled in the art in practicing the present invention, from a study of the drawings, the disclosure and the claims. Such modifications may involve other features, which are already known in the art and may be used instead of or in addition to features already described herein. In the claims, the word "comprising" does not exclude other elements or steps, and the indefinite article "a" or "an" does not exclude a plurality.

THE LIST OF REFERENCE SIGNS IS AS FOLLOWS 10 brake disc
11 brake disc body 12 brake disc contact surface layer
13 axle
20 brake pad
$p_{brk}$ braking pressure
$P_{brk}$ braking power
$\dot{Q}_{cont,\,cond}$ heat loss of the brake disc contact surface layer due to conduction
$\dot{Q}_{conv}$ heat loss of the brake disc body due to convection
$\dot{Q}_{disc,cont}$ heat loss of the brake disc body due to conduction
$\dot{Q}_{rad}$ heat loss of the brake disc body due to radiation

The invention claimed is:

1. A method for estimating a brake temperature ($T_{brk}$) of a brake disc of a vehicle, the method comprising:
   virtually separating the brake disc in a brake disc body and a brake disc contact surface layer; and
   estimating the temperature ($T_{cont}$) of the brake disc contact surface layer in dependence of the temperature ($T_{disc}$) of the braking disc body and a heat input in the brake disc contact surface layer due to a braking action;
   wherein the estimated temperature ($T_{cont}$) of the brake disc contact surface layer corresponds to the brake temperature ($T_{brk}$).

2. The method of claim 1, wherein the temperature ($T_{cont}$) of the brake disc contact surface layer is estimated by iteratively applying the thermal balance equation:

$$m_{cont} \times c_{cont} \times \dot{T}_{cont} = \Sigma \dot{Q} = \dot{Q}_{cont,in} - \dot{Q}_{cont,rad} - \dot{Q}_{cont,conv} - \dot{Q}_{cont,cond},$$

wherein $m_{cont}$ is a mass of the brake disc contact surface layer in [kg], $c_{cont}$ is a thermal capacity of the brake disc contact surface layer in [J/(kgK)], $\dot{T}_{cont}$ is a temperature change of the brake disc contact surface layer in [° C./s], $\dot{Q}_{cont,in}$ is a heat input in the brake disc contact surface layer due to a braking action in [J/s], $\dot{Q}_{cont,rad}$ is a heat loss of the brake disc contact surface layer due to heat radiation in [J/s], $\dot{Q}_{cont,conv}$ is a heat loss of the brake disc contact surface layer due to convection in [J/s], and $\dot{Q}_{cont,conv}$ is a heat loss of the brake disc contact surface layer due to conduction in [J/s].

3. The method of claim 2, wherein $\dot{Q}_{cont,in}$ is calculated as:

$$\dot{Q}_{cont,in} = (1-\gamma) \times P_{brk},$$

wherein $\gamma$ is a transition coefficient from a braking pad (20) to the brake disc contact surface layer, and $P_{brk}$ is a braking power.

4. The method of claim 3, wherein $P_{brk}$ is calculated as:

$$P_{brk} = -\frac{dE_{kin}}{dt} - \frac{dE_{pot}}{dt} = -\frac{1}{2}(m_{dyn} \cdot v_{veh} \cdot a_{veh} - m_{dyn} \cdot g \cdot h),$$

wherein $dE_{kin}/dt$ is a change in potential energy, $dE_{pot}/dt$ is a change in kinetic energy, $m_{dyn}$ is a dynamic wheel load per axle, $a_{veh}$ is an acceleration of the vehicle, g is a gravity acceleration, and h is a change in altitude.

5. The method of claim 3, wherein $P_{brk}$ is calculated as:

$$P_{brk} = F_{brk} \times \Delta v = M_{brk} \times \frac{v_{veh}}{r_{dyn}},$$

wherein $F_{brk}$ is a braking force, $\Delta v$ is the relative lateral (slip) velocity between brake pad and disc, $M_{brk}$ is a braking torque, and $r_{dyn}$ is the dynamic wheel radius.

6. The method of claim 2, wherein $\dot{Q}_{cont,rad}$ is calculated as:

$$\dot{Q}_{cont,rad} = e \cdot \sigma \cdot A_{cont} \cdot (T_{cont}^4 - T_{env}^4),$$

wherein e an emission degree $e \in [0, 1]$, $\sigma$ is the Stefan-Boltzmann constant $\sigma = 5.67 \times 10^{-8}$ W/(m²K⁴), $A_{cont}$ is a contact area of the brake disc contact surface layer in [m²], and $T_{env}$ is the temperature of an environment.

7. The method of claim 2, wherein $\dot{Q}_{cont,conv}$ is calculated as:

$$\dot{Q}_{cont,conv} = h_{cont} \cdot A_{cont} \cdot (T_{cont} - T_{env}),$$

wherein $h_{cont}$ is a heat transfer coefficient of the brake disc contact surface layer in [W/(m²K)].

8. The method of claim 2, wherein $\dot{Q}_{cont,cond}$ is calculated as:

$$\dot{Q}_{cont,cond} = \lambda \cdot A_{cont} \cdot (T_{cont} - T_{disc})/d_{cont},$$

wherein $\lambda$ is a thermal conductivity of the brake disc contact surface layer in [W/(mK)], and $d_{cont}$ is a thickness of the brake disc contact surface layer in [m].

9. The method of claim 8, wherein $T_{disc}$ is detected by a sensor.

10. The method of claim 8, wherein the temperature ($T_{disc}$) of the brake disc body is estimated by iteratively applying the thermal balance equation:

$$m_{disc} \cdot c_{disc} \cdot \dot{T}_{disc} = \Sigma \dot{Q} = \dot{Q}_{disc,in} - \dot{Q}_{disc,rad} - \dot{Q}_{disc,conv} - \dot{Q}_{disc,cond} = \dot{Q}_{cont,cond} - \dot{Q}_{disc,rad} - \dot{Q}_{disc,conv} - \dot{Q}_{disc,cond},$$

wherein $m_{disc}$ is a mass of the brake disc body in [kg], $c_{disc}$ is a thermal capacity of the brake disc body in [J/(kgK)], $\dot{T}_{disc}$ is a temperature change of the brake disc body in [° C./s], $\dot{Q}_{disc,in}$ is the heat input in the brake disc body due to conduction from the brake disc contact surface layer in [J/s], $\dot{Q}_{disc,rad}$ is a heat loss of the brake disc body due to heat radiation in [J/s], $\dot{Q}_{disc,conv}$ is a heat loss of the brake disc body due to convection in [J/s], and $\dot{Q}_{disc,cond}$ is a heat loss of the brake disc contact surface layer due to conduction in [J/s].

11. The method of claim 10, wherein $\dot{Q}_{disc,rad}$ is calculated as:

$$\dot{Q}_{disc,rad} = e \cdot \sigma \cdot A_{disc,out} \cdot (T_{disc}^4 - T_{env}^4)$$

wherein $A_{disc,out}$ is an outer area of the brake disc body in [m²].

12. The method of claim 10, wherein $\dot{Q}_{disc,conv}$ is calculated as:

$$\dot{Q}_{disc,conv} = h_{disc} \cdot (A_{disc,out} + A_{disc,in}) \cdot (T_{disc} - T_{env}),$$

wherein $h_{disc}$ is a heat transfer coefficient of the brake disc body in [W/(m²K)], and $A_{disc,in}$ is an inner area of the brake disc body in [m²].

13. The method of claim 10, wherein $\dot{Q}_{disc,cond}$ is calculated as:

$$\dot{Q}_{disc,cond} = \lambda \cdot A_{axle} \cdot (T_{disc} - T_{axle})/(l_{axle}/2),$$

wherein $A_{axle}$ is an axle cross section area in [m²], $T_{axle}$ is a temperature of the axle in [° C.], and $l_{axle}$ is a length of the axle in [m].

14. The method of claim 10, wherein the initial condition for $T_{disc,n}$ and $T_{cont,n}$ and/or $\dot{T}_{disc,n}$ is predetermined and $T_{disc,n+1}$ is calculated as $T_{disc,n+1} = T_{disc,n} + \Delta t \cdot \dot{T}_{disc,n}$.

15. The method of claim 2, wherein an initial condition for $\dot{T}_{cont,n}$ and/or $T_{cont,n}$ is predetermined and $T_{cont,n+1}$ is calculated as $T_{cont,n+1} = T_{cont,n} + \Delta t \cdot \dot{T}_{cont,n}$, wherein $\dot{Q}_{cont,rad}$ is calculated as:

$$\dot{Q}_{cont,rad} = e \cdot \sigma \cdot A_{cont} \cdot (T_{cont}^4 - T_{env}^4),$$

wherein e an emission degree e∈[0, 1], σ is the Stefan-Boltzmann constant $6=5.67*10^{-8}$ W/(m²K⁴), $A_{cont}$ is a contact area of the brake disc contact surface layer in [m²], and $T_{env}$ is the temperature of an environment.

16. A method for estimating a braking factor of a disc brake of a vehicle, wherein the braking factor is determined based on a brake temperature ($T_{brk}$) as estimated by estimating a brake temperature ($T_{brk}$) of a brake disc of a vehicle, by performing the following:

virtually separating the brake disc in a brake disc body and a brake disc contact surface layer; and estimating the temperature ($T_{cont}$) of the brake disc contact surface layer in dependence of the temperature ($T_{disc}$) of the braking disc body and a heat input in the brake disc contact surface layer due to a braking action;

wherein the estimated temperature ($T_{cont}$) of the brake disc contact surface layer corresponds to the brake temperature ($T_{brk}$).

17. An apparatus for estimating a brake temperature ($T_{brk}$) of a brake disc of a vehicle, comprising:

a control configured to estimate a temperature ($T_{cont}$) of a brake disc contact surface layer, wherein the control is configured to convert the temperature ($T_{cont}$) of a brake disc contact surface layer in a corresponding brake temperature ($T_{brk}$);

wherein the brake temperature ($T_{brk}$) is estimated by estimating a brake temperature ($T_{brk}$) of a brake disc of a vehicle, by performing the following:

virtually separating the brake disc in a brake disc body and a brake disc contact surface layer; and estimating the temperature ($T_{cont}$) of the brake disc contact surface layer in dependence of the temperature ($T_{disc}$) of the braking disc body and a heat input in the brake disc contact surface layer due to a braking action;

wherein the estimated temperature ($T_{cont}$) of the brake disc contact surface layer corresponds to the brake temperature ($T_{brk}$).

18. A non-transitory computer readable medium having a computer program, which is executable by a processor, comprising:

a program code arrangement having program code for estimating a brake temperature ($T_{brk}$) of a brake disc of a vehicle, by performing the following:

virtually separating the brake disc in a brake disc body and a brake disc contact surface layer; and estimating the temperature ($T_{cont}$) of the brake disc contact surface layer in dependence of the temperature ($T_{disc}$) of the braking disc body and a heat input in the brake disc contact surface layer due to a braking action;

wherein the estimated temperature ($T_{cont}$) of the brake disc contact surface layer corresponds to the brake temperature ($T_{brk}$).

* * * * *